(No Model.) 2 Sheets—Sheet 2.

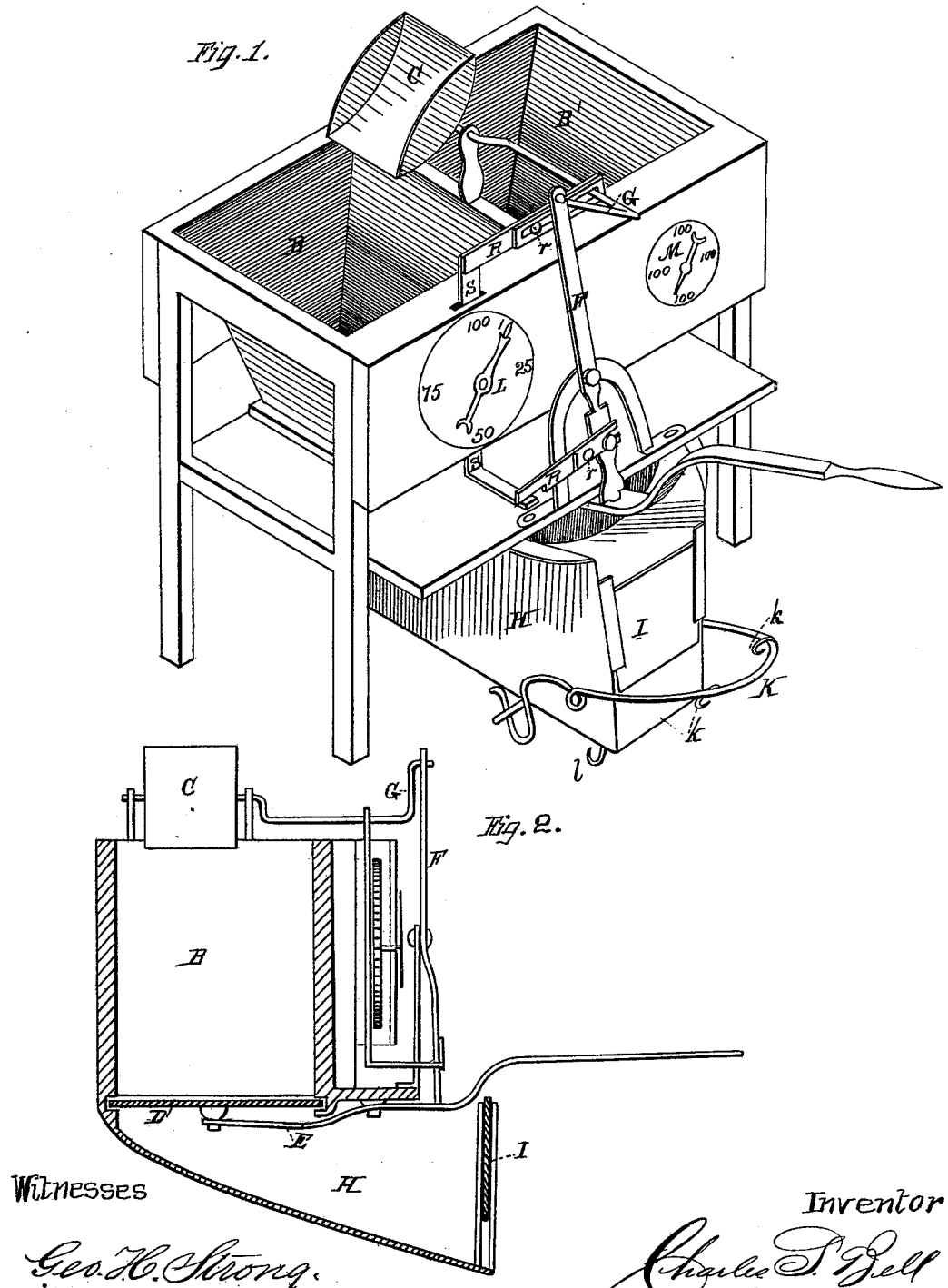

C. S. BELL.
Grain Measure and Register.

No. 233,136. Patented Oct. 12, 1880.

Witnesses
Geo. H. Strong
Frank A. Brook

Inventor
Charles S. Bell
By Dewey & Co.
Attys

UNITED STATES PATENT OFFICE.

CHARLES S. BELL, OF AMADOR CITY, CALIFORNIA, ASSIGNOR OF ONE-HALF OF HIS RIGHT TO J. R. JOHNS AND W. W. KIRKLAND.

GRAIN MEASURE AND REGISTER.

SPECIFICATION forming part of Letters Patent No. 233,136, dated October 12, 1880.

Application filed July 10, 1880. (No model.)

*To all whom it may concern:*

Be it known that I, CHARLES S. BELL, of Amador City, county of Amador, and State of California, have invented an Improved Grain Register and Measure; and I hereby declare the following to be a full, clear, and exact description thereof.

My invention relates to an improved grain register and measure; and my improvements consist in certain details of construction and combination of parts whereby the grain from the separator is measured, and the amount that passes through the measure is registered and afterward passed to the sack in the sack-holder, as is more fully described in the accompanying drawings.

Figure 3:
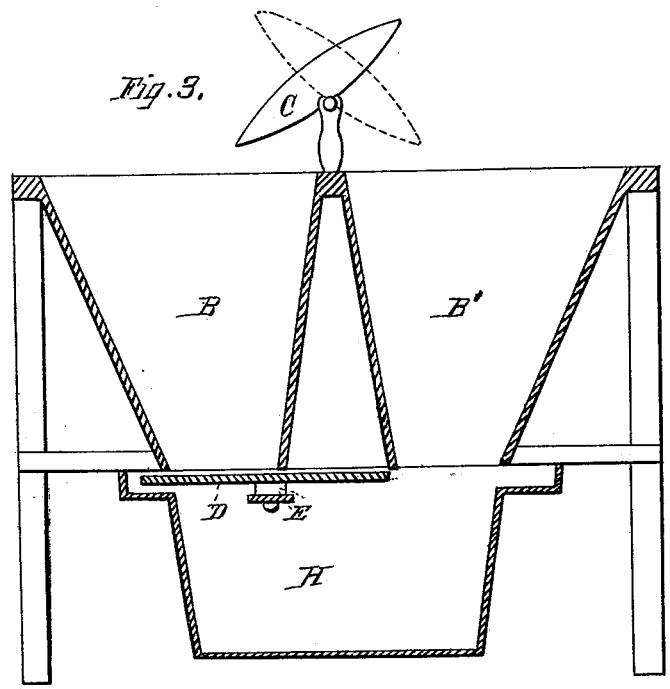
Figure 4:
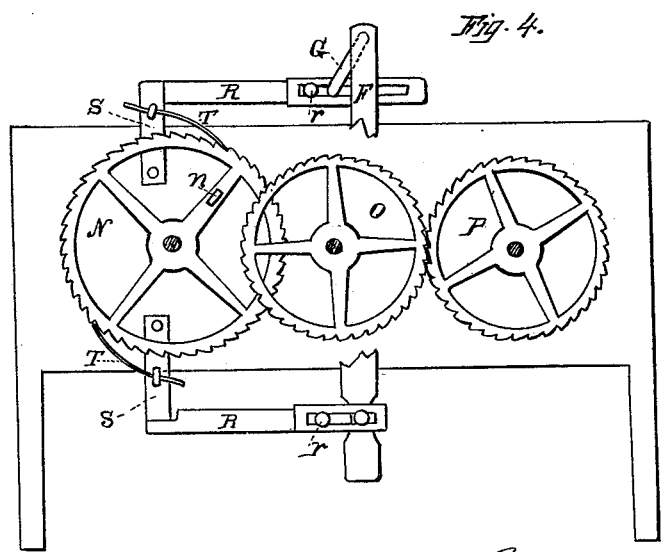

Figure 1 is a perspective view of my device. Figs. 2 and 3 are sections of the same. Fig. 4 shows the dial mechanism.

On suitable frame-work are mounted two measures, B B′, side by side, each adapted to hold an equal quantity of grain, preferably one bushel each. Where, however, it is not intended to sack the grain, they may each hold two bushels. A tip-pan, C, is placed over and between these measures, into which the grain pours from the grain-spout of the separator. This tip-pan is intended to change the grain to the measures alternately, and as soon as one measure is filled the pan is turned to charge into the other.

A slip-gate or false bottom, D, is placed under the measures and secured on a lever, E, so that as it closes the bottom of one measure it opens that of the other, this action being alternate. As soon as the measure is filled a movement of the lever opens the bottom and lets that grain flow out, and the same movement throws the bottom over and closes the other previously-emptied measure. Connected with this lever E is a vertical lever, F, swiveled on the crank G of the tip-pan, as shown, so that the movement of the lever E, in opening and closing the bottom, also moves the tip-pan, so that it will direct the grain into the measure in which the bottom is closed, making it impossible for any grain to be directed into the measure without the bottom.

A chute, H, receives the grain from the measures B B′, and thence carries it into the sack at the mouth of the chute held by the sack-holder. This chute has a gate, I, which is to be used when the grain is being sacked, as when the measure does not fill the sack the measurer can let out enough more to fill the sack, and then stop the flow of grain from the chute until he changes the sack without interfering in any way with the grain that is being measured.

The sack-holder K is composed of a swiveled curved bar having hooks *k* upon it, corresponding fixed hooks *l* being placed on the bottom of the chute for the other corners of the sack.

On the side of the case or frame are fixed the index-fingers L M, as shown, these moving on a dial to indicate and register the amount of grain passing through the measures. Inside the case is a train of three wheels, N O P, with which the hands are connected, the train being set in motion each time the lever is moved that trips the tip-pan.

The hand L is arranged to count from one to one hundred. The hand M registers hundreds alone. If the hand M stands at 2, and the hand L stands at 25, the combined hands indicate that two hundred and twenty-five bushels of grain have passed through the measures, and so on. On the main wheel N is a lug, *n*, which, every time the main wheel N revolves once, comes in contact with the central wheel, O, and this revolves the pointer-wheel P, which turns the hand M once.

On the lever F are two arms, R R, each having an adjusting-nut, *r r*, and these connect with bars S S, having spring-pawls T T, which engage with the main wheel of the series to revolve it. The adjustable arms admit of regulating the stroke of the springs or pawls. The movement of the lever F therefore brings these pawls into contact with the wheel alternately, or each time it is moved in either direction the wheel is revolved sufficiently to move the pointer one mark on the dial without fail. In this way the grain is measured accurately and the amount thrashed is registered.

The measure may be used for any similar purpose, such as measuring grain in ships loaded in bulk, in warehouses, &c.

When the measures are made to hold two bushels the figures on the dials will be marked in twos, and will count two, four, six, and so on. The other dial will be correspondingly arranged.

Having thus described my invention, what I claim as new, and desire to secure by Letters Patent, is—

1. In combination with the oppositely-placed stationary measures B B' and the tip-pan C, the levers E F and false sliding bottom D, whereby the tip-pan and bottom are simultaneously operated to direct the grain into the empty measure and discharge it from the full one, substantially as and for the purpose herein described.

2. In combination with the measures B B', tip-pan C, levers E F, and sliding bottom D, the index-fingers L M on the indicating-dials, the operating-wheels N O P, adjustable arm R R, bars S S, and pawls T T, whereby the grain is measured, discharged, and the amount indicated and registered simultaneously, substantially as herein set forth.

In witness whereof I have hereunto set my hand.

CHARLES SPRINGER BELL.

Witnesses:
E. A. SLOUT,
H. W. MCDONALD.